United States Patent
Hsu

(10) Patent No.: US 10,839,523 B2
(45) Date of Patent: Nov. 17, 2020

(54) POSITION-BASED ADJUSTMENT TO DISPLAY CONTENT

(71) Applicant: Otis Elevator Company, Farmington, CT (US)

(72) Inventor: Arthur Hsu, South Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 134 days.

(21) Appl. No.: 15/981,161

(22) Filed: May 16, 2018

(65) Prior Publication Data

US 2019/0355129 A1 Nov. 21, 2019

(51) Int. Cl.
| | |
|---|---|
| G06T 7/20 | (2017.01) |
| G06T 5/00 | (2006.01) |
| G06T 7/70 | (2017.01) |
| G06T 3/00 | (2006.01) |
| G06K 9/00 | (2006.01) |
| G06T 3/60 | (2006.01) |

(52) U.S. Cl.
CPC ............ *G06T 7/20* (2013.01); *G06K 9/00228* (2013.01); *G06K 9/00348* (2013.01); *G06T 3/0093* (2013.01); *G06T 3/60* (2013.01); *G06T 5/003* (2013.01); *G06T 7/70* (2017.01); *G06T 2207/20201* (2013.01); *G06T 2207/30241* (2013.01); *G06T 2207/30242* (2013.01)

(58) Field of Classification Search
CPC .. G06T 7/20; G06T 5/003; G06T 7/70; G06T 3/0093; G06T 3/60; G06T 2207/20201; G06K 9/00228; G06K 9/00348

USPC ................. 382/103, 151, 216, 291
See application file for complete search history.

(56) References Cited

U.S. PATENT DOCUMENTS

| | | | |
|---|---|---|---|
| 5,781,505 A * | 7/1998 | Rowland | ................... F41J 5/06 367/127 |
| 6,931,596 B2 | 8/2005 | Gutta et al. | |
| 8,115,877 B2 | 2/2012 | Blatchley et al. | |
| 8,970,455 B2 | 3/2015 | Thorson et al. | |
| 8,981,962 B2 | 3/2015 | Fu | |
| 9,123,142 B2 | 9/2015 | Sullivan et al. | |
| 9,367,898 B2 | 6/2016 | Jothiswaran et al. | |
| 9,535,495 B2 | 1/2017 | Angelo et al. | |
| 9,704,220 B1 | 7/2017 | Bakar et al. | |
| 9,805,516 B2 | 10/2017 | Liu et al. | |
| 2002/0149613 A1 * | 10/2002 | Gutta | ...................... G06F 3/011 715/728 |
| 2006/0007191 A1 | 1/2006 | Chi et al. | |
| 2008/0049020 A1 | 2/2008 | Gusler et al. | |

(Continued)

OTHER PUBLICATIONS

Cheng, Lung-Pan et al., "iRotate: Automatic Screen Rotation based on Face Orientation", CHI 2012, May 5-10, 2012, Austin, TX (8 pp.).

*Primary Examiner* — Ayodeji O Ayotunde
(74) *Attorney, Agent, or Firm* — Cantor Colburn LLP

(57) ABSTRACT

According to an aspect, a method of position-based adjustment to display content is provided. The method includes determining a position of an observer relative to a display device. The method also includes determining a distortion correction to apply to a plurality of display content based on the position of the observer relative to the display device to correct the display content with respect to the observer. The distortion correction of the display content is output to the display device.

18 Claims, 6 Drawing Sheets

(56) References Cited

U.S. PATENT DOCUMENTS

| | | | |
|---|---|---|---|
| 2010/0080464 A1 | 4/2010 | Sawai et al. | |
| 2011/0249153 A1* | 10/2011 | Hirooka | B60R 1/00 |
| | | | 348/241 |
| 2014/0092139 A1* | 4/2014 | Sullivan | G09G 5/00 |
| | | | 345/649 |
| 2014/0320624 A1 | 10/2014 | Lee et al. | |
| 2016/0176344 A1* | 6/2016 | Wang | G06K 9/00791 |
| | | | 348/36 |
| 2017/0318283 A1 | 11/2017 | Watson et al. | |
| 2017/0367633 A1* | 12/2017 | Samadani | A61B 3/113 |

* cited by examiner

POSITION-BASED ADJUSTMENT TO DISPLAY CONTENT

BACKGROUND

The subject matter disclosed herein generally relates to the field of displays, and more particularly to position-based adjustments to display content.

Display content can include text and graphics, for instance, to give wayfinding guidance to a person, where it is assumed that the person is directly facing a display screen rather than viewing from an oblique angle. However, in the context of a shared public display screen, users often do not stop in front of a stationary monitor but continue walking to avoid disrupting the flow of people following or to reduce the time wasted in stopping and re-starting. If a person attempts to read display content while walking past the display screen, the change in perspective can make it difficult to process the information accurately due to the static content and motion of the person.

BRIEF SUMMARY

According to one embodiment, a method of position-based adjustment to display content is provided. The method includes determining a position of an observer relative to a display device. The method also includes determining a distortion correction to apply to a plurality of display content based on the position of the observer relative to the display device to correct the display content with respect to the observer. The distortion correction of the display content is output to the display device.

In addition to one or more of the features described above or below, or as an alternative, further embodiments may include where determining the position of the observer relative to the display device includes determining one or more angular differences between the observer and the display device.

In addition to one or more of the features described above or below, or as an alternative, further embodiments may include determining a trajectory of movement of the observer relative to the display device by tracking movement of the observer and projecting a likely future position of the observer, and determining the distortion correction to apply to the display content based on the trajectory.

In addition to one or more of the features described above or below, or as an alternative, further embodiments may include where the display content includes a graphical depiction of a tracked current direction of the observer and a change in the tracked current direction as a projection towards the likely future position of the observer.

In addition to one or more of the features described above or below, or as an alternative, further embodiments may include adjusting the distortion correction as the observer continues to change position relative to the display device, where the distortion correction includes at least a rotation and rescaling operation performed on the display content.

In addition to one or more of the features described above or below, or as an alternative, further embodiments may include tracking movement of the observer as the observer transitions from a location proximate to the display device to another location proximate to one or more other display devices, and displaying a set of content to the observer on the one or more other display devices customized for the observer.

In addition to one or more of the features described above or below, or as an alternative, further embodiments may include where movement of the observer is tracked based on one or more of: at least one feature of the observer and/or a signal from a mobile device of the observer.

In addition to one or more of the features described above or below, or as an alternative, further embodiments may include identifying one or more additional observers facing the display device, and adjusting the distortion correction to blend the position of the observer and the one or more additional observers in correcting the display content.

In addition to one or more of the features described above or below, or as an alternative, further embodiments may include transitioning the distortion correction from the observer to at least one of the one or more additional observers facing the display device based on one or more of: detecting a change in a number of observers and/or detecting a change in observer proximity relative to the display device.

In addition to one or more of the features described above or below, or as an alternative, further embodiments may include identifying one or more additional observers facing the display device, partitioning the display device into a plurality of display segments, and providing separate content with individualized distortion correction to each of the display segments.

According to another embodiment, a system is provided. The system includes a display device, one or more sensors operable to detect a position of an observer, and a display adjustment system operably coupled to the display device and the one or more sensors. The display adjustment system is configured to perform a plurality of operations including determining a position of an observer relative to the display device based on the one or more sensors, determining a distortion correction to apply to a plurality of display content based on the position of the observer relative to the display device to correct the display content with respect to the observer, and outputting the distortion correction of the display content to the display device.

Technical effects of embodiments of the present disclosure include applying a distortion correction to display content on a display device to account for a position and/or trajectory of movement of an observer of the display content.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

As will be described below, embodiments adjust display content, such as text and graphics, with respect to an observer as the observer changes positions relative to a display device. In the context of wayfinding guidance displays that may display directional arrows and navigation information, observers often do not stop in front of a display device but continue looking at the display device while passing by the display device. As an observer moves relative to a display device in a fixed position, the observer may have a difficult time understanding the content, as information or directional arrows can appear distorted due to the changing perspective of the observer. Embodiments use one or more sensors to track the position (e.g., location and/or orientation) and trajectory of an observer of the display device. By determining a position of an observer relative to the display device and a trajectory of the observer relative to the display device, a distortion correction can be applied to display content to correct the display content with respect to the observer.

Figure 1:
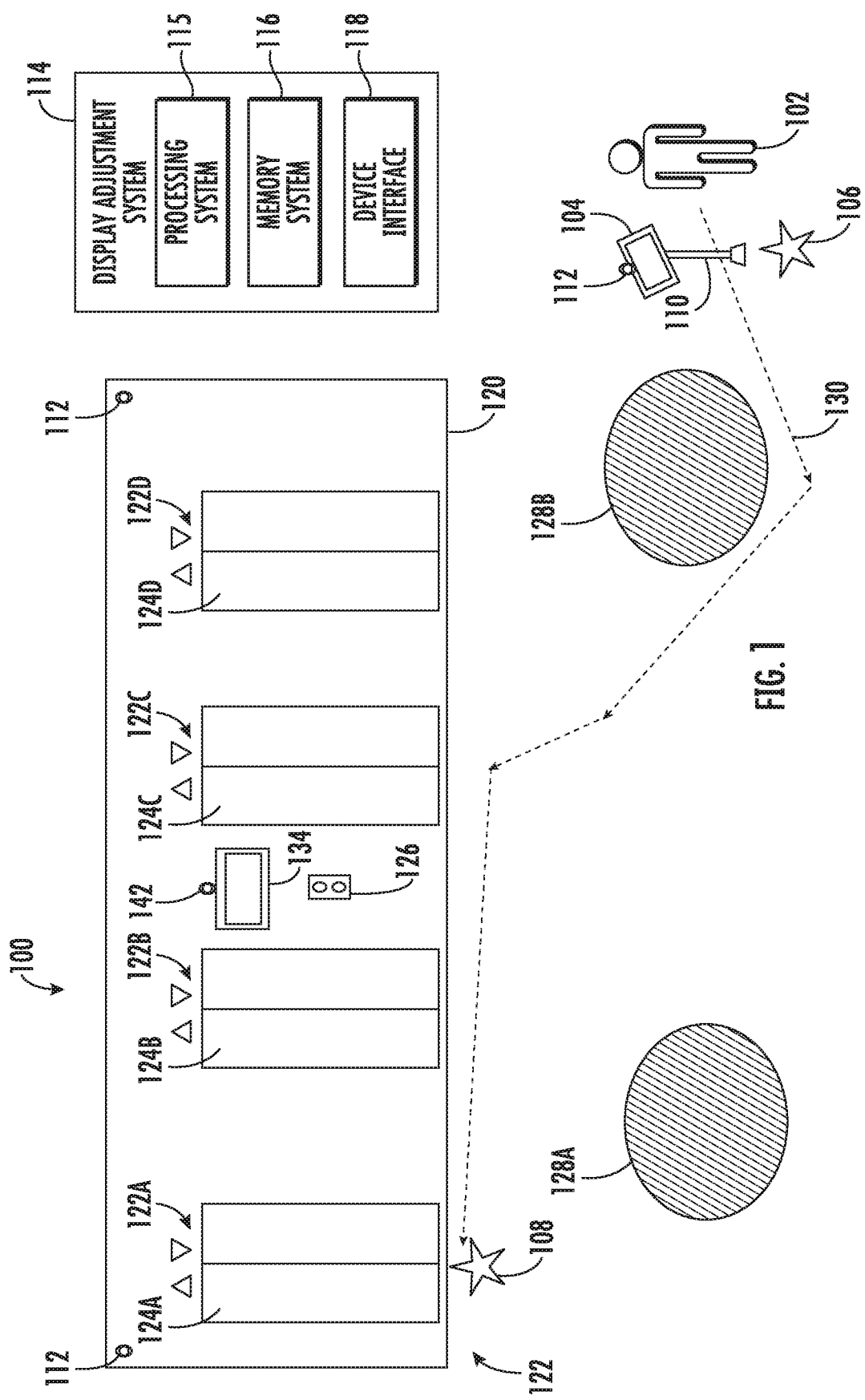
FIG. 1 illustrates a general schematic system diagram of a display system, in accordance with an embodiment of the disclosure.

With reference to FIG. 1, a system 100 for position-based adjustment to display content is illustrated, in accordance with an embodiment of the present disclosure. As seen in FIG. 1, an observer 102 can view a display device 104 (e.g., a computer monitor) while transitioning between a location 106 proximate to the display device 104 and a desired end-point location 108. The display device 104 can be a kiosk 110 in a substantially fixed position that is viewable by the observer 102 while transitioning across the location 106.

In some embodiments, display content to be displayed on the display device 104 includes directions in text and/or graphic form to assist the observer 102 in navigating through a building. One or more sensors 112 can be used to determine a position of the observer 102, where the position includes a location and/or orientation of the observer 102 relative to the display device 104. For instance, the one or more sensors 112 can include a camera configured to capture at least one feature of the observer 102, such as a head shot and/or body shot of the observer 102.

The example of FIG. 1 is an elevator lobby 120 that includes multiple elevator access points 122A, 122B, 122C, 122D (generally, 122). Each of the elevator access points 122A, 122B, 122C, 122D can be associated with a set of elevator doors 124A, 124B, 124C, 124D and at least one elevator input fixture 126. There may be various impediments for the observer 102 to travel between the location 106 proximate to the display device 104 and the desired end-point location 108, such as objects 128A, 128B. The objects 128A, 128B are examples of path movement constraints (e.g., furniture, support columns, various structures, etc.) that limit the likely future position of the observer 102. Given that the desired end-point location 108 is one of the elevator access points 122 in FIG. 1, the objects 128A, 128B may limit the movement options of the observer 102, for instance, such that the observer 102 is most likely to pass between the objects 128A, 128B. The one or more sensors 112 can be used to determine a position and a trajectory 130 of the observer 102 by monitoring movement over a period of time.

Further, as the observer 102 transitions away from the display device 104 along the trajectory 130, one or more other display devices 134 may become visible to the observer 102. There may be one or more sensors 142 operable to track a position of the observer 102 in proximity to the one or more other display devices 134.

Examples of the sensors 112 and 142 can include one or more of a 2D red, green, blue (RGB) surveillance camera and/or a depth sensor providing three-dimensional (3D) information that includes the distance between the object and the depth sensor. Various 3D depth sensing technologies and devices that can be used include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, echolocation, laser radar, scanning light detection and ranging (LIDAR), flash LIDAR or a combination including at least one of the foregoing. Different technologies can include active (transmitting and receiving a signal) or passive (only receiving a signal) and may operate in a band of the electromagnetic or acoustic spectrum such as visual, infrared, ultrasonic, floor pressure mats, etc. In various embodiments, a 3D depth sensor may be operable to produce 3D information from defocus, a focal stack of images or structure from motion. Similarly, a plurality of 2D depth sensors can be used to provide two-dimensional information that includes the distance between the object and the depth sensor.

A display adjustment system 114 can be incorporated into or operably coupled to the display devices 104, 134 and/or the one or more sensors 112, 142 in a local, networked, or distributed configuration. The display adjustment system 114 can include a processing system 115, a memory system 116, and a device interface 118. The processing system 115 may be but is not limited to a single-processor or multiprocessor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory system 116 may be a storage device such as, for example, a random access memory (RAM), read only memory (ROM), or other electronic, optical, magnetic or any other computer readable storage medium. The memory system 116 can include computer-executable instructions that, when executed by the processing system 115, cause the processing system 115 to perform operations as further described herein. The device interface 118 can include wired, wireless, and/or optical communication links to either or both display devices 104, 134 and the one or more sensors 112, 142. Although only a single instance of the display adjustment system 114 is depicted in FIG. 1, it will be understood that there can be multiple instances of the display adjustment system 114 to support multiple instances of the display devices 104, 134 and the one or more sensors 112, 142, or a single instance of the display adjustment system 114 can support multiple instances of the display devices 104, 134 and the one or more sensors 112, 142.

The display adjustment system 114 is operable to capture data from the one or more sensors 112, 142 and perform facial and/or body orientation detection. The facial and/or body orientation detection may use known image processing techniques to identify features of the observer 102. For instance, facial recognition performed by the display adjustment system 114 can track relative geometry of facial features such as eyes, mouth, nose, forehead, chin, and other features to both estimate the position (including orientation) of the observer 102 and also distinguish between multiple observers. The display adjustment system 114 is also operable to apply a distortion correction to display content based on the position and trajectory of the observer 102 relative to each display device 104, 134 to correct the display content with respect to the observer 102. For example, as the observer 102 approaches and passes location 106, the angle of a line-of-sight of the observer 102 changes relative to a display surface of the display device 104. Examples are further provided herein with respect to FIGS. 3-5. Further, as the display adjustment system 114 identifies and tracks movement of the observer 102 passing the location 106, the display adjustment system 114 can anticipate the trajectory 130 of the observer 102 approaching the display device 134, where the display content of the display device 134 can include further directions specific to the observer 102 (e.g., targeting the elevator access points 122A) and provide distortion correction using the one or more sensors 142.

Figure 2:
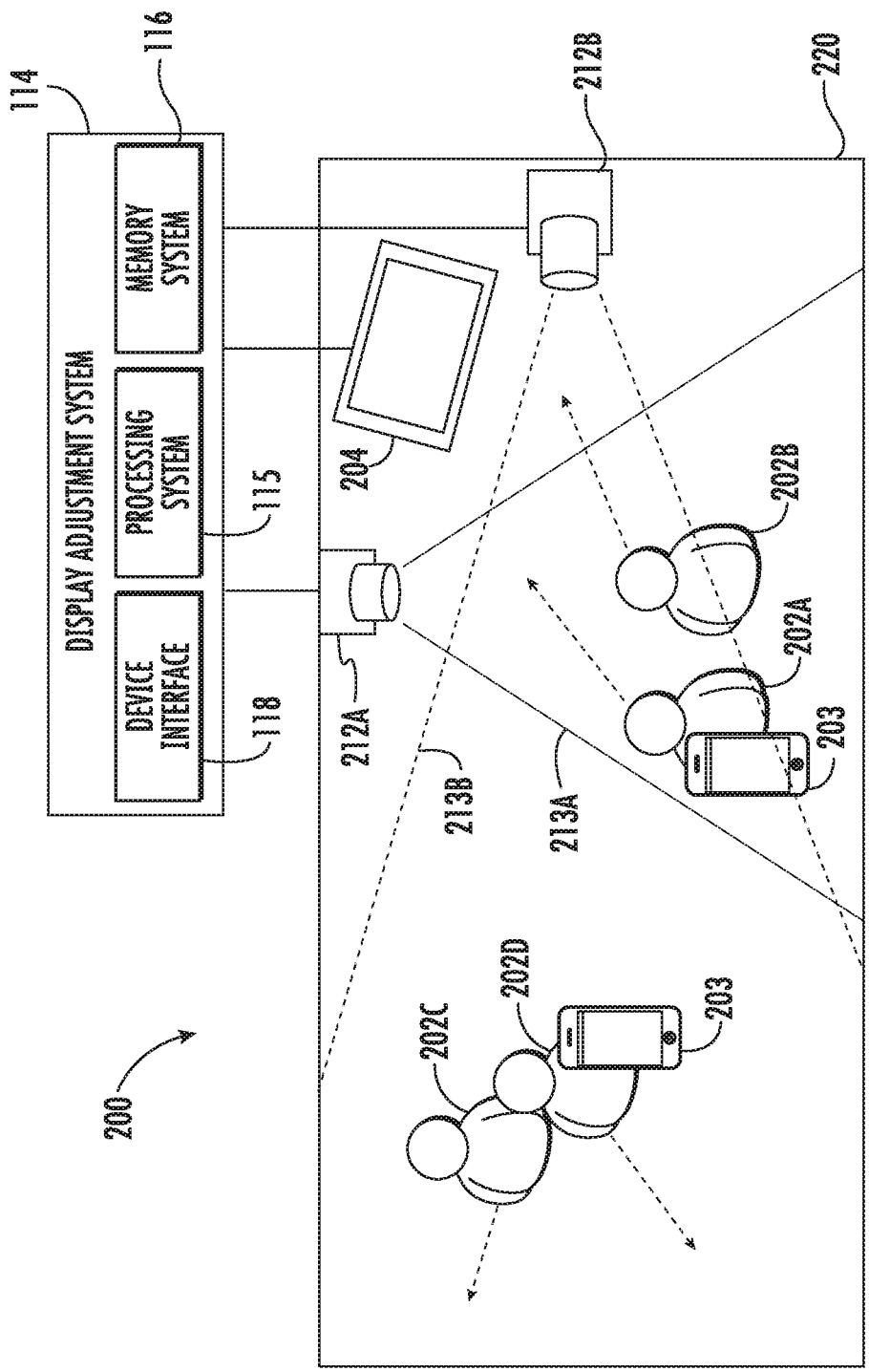
FIG. 2 illustrates a general schematic system diagram of a display system, in accordance with an embodiment of the disclosure.

FIG. 2 depicts a configuration of system 200 as a variation of the system 100 of FIG. 1 for position-based adjustment to display content. In the example of FIG. 2, the display adjustment system 114 interfaces to a display device 204 that is an embodiment of the display device 104 mounted in a corridor 220. Sensors 212A and 212B are embodiments of the one or more sensors 112 of FIG. 1 mounted at different positions relative to the display device 204. For example, the sensors 212A, 212B can be positioned such that a field-of-view 213A of sensor 212A overlaps with a field-of-view 213B of sensor 212B. The overlapping of the field-of-view 213A, 213B can be used to better track the trajectory of observers 202 (A, B, C, D) and assist in confirming which observers 202 are most likely viewing the display device 204. For example, observers 202A, 202B may both be in close enough proximity to the display device 204 to see any display content, but observers 202C, 202D may be too far from the display device 204 to read the display content. In the example of FIG. 2, observers 202A, 202B are observed as having trajectories moving toward the display device 204 and may have variations in both position and trajectory, while observers 202C, 202D are moving further away from the display device 204.

In embodiments that support distortion correction for multiple observers 202A, 202B, a single display may be shared with multiple observers each with separate content that is individually distortion corrected by the display adjustment system 114. In another embodiment, the display adjustment system 114 may compute a single blended correction image to reduce distortion shared by the observers 202A, 202B. For instance, an average or weighted combination can be applied for distortion correction by averaging the positions of the observers. When a weighted combination is used, the display adjustment system 114 may give greater correction weight to the observer 202B in closer physical proximity to the display device 204, for example. Transitioning the distortion correction from an observer 202A to at least one or more additional observers 202B facing the display device 204 can be perform, for instance, based on one or more of: detecting a change in a number of observers 202A, 202B, and/or detecting a change in observer proximity relative to the display device 204. The display device 204 may output an informational notice to indicate which of the observers 202A, 202B are currently being tracked for distortion correction.

In some embodiments, the display adjustment system 114 may interface with a mobile device 203 of one or more of the observers 202A-D to assist in determining position and/or trajectory. For example, an application loaded on the mobile devices 203 that is compatible with the display adjustment system 114 can assist the observers 202A-D with wayfinding through the display device 204, for instance, through a Wi-Fi or Bluetooth link between one or more mobile devices 203 and the display adjustment system 114. For instance, position and movement data captured by the mobile devices 203, e.g., through accelerometers, global positioning system data, and/or other sensors incorporated in the mobile devices 203 can be used to inform the display adjustment system 114 of observers' 202A-D trajectories. The observers 202A-D need not actively view the mobile devices 203 for display content; rather, the display content can be output on the display device 204, for instance, to assist in heads-up navigation through the corridor 220 with further instructions/directions provided on the display device 204 as a next turn or set of turns for the observers 202A, 202B to make. The position and/or movement data provided by the mobile devices 203 can assist the display adjustment system 114 in anticipating the approach of observers 202A-D prior to the observers 202A-D entering either or both of the field-of-view 213A, 213B.

Figure 3:
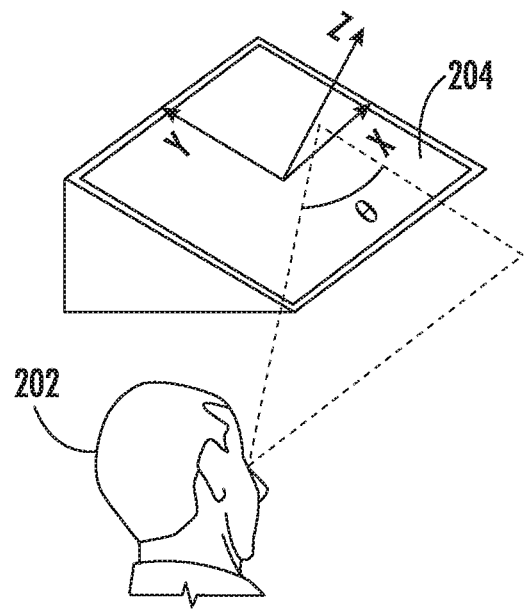
FIG. 3 illustrates an observer relative to a display device establishing a first observation angle, in accordance with an embodiment of the disclosure.
Figure 4:
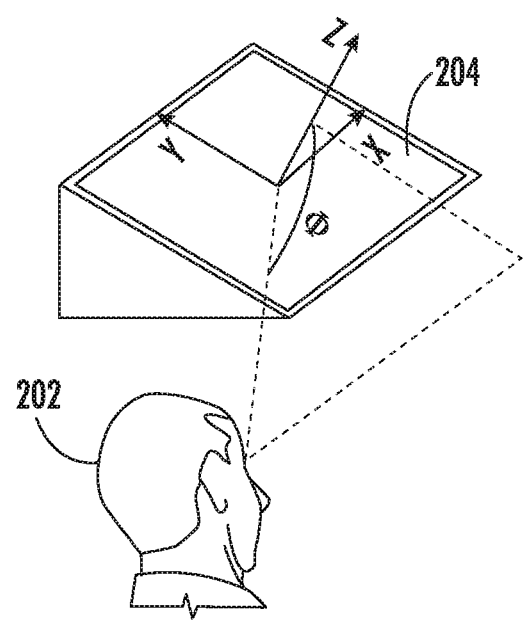
FIG. 4 illustrates an observer relative to a display device establishing a second observation angle, in accordance with an embodiment of the disclosure.

FIGS. 3 and 4 illustrate an example of an observer 202 relative to the display device 204 establishing a first observation angle ($\theta$) and a second observation angle ($\phi$). In embodiments using depth sensors, object positions may be initially calculated using a sensor-based coordinate system (u,v,d), where (u,v) is the horizontal and vertical position according to the sensor and d is the distance from the sensor. The (u,v,d) coordinates can be transformed to "world coordinates" based on a more useful frame of reference. For instance, a frame of reference can be defined with respect to the display device 204. Accordingly, a world coordinate system can include (x,y) coordinates as a horizontal and vertical position on the display device 204 and z as the direction facing away from the display device 204. The origin is located at the center of the display device 204.

Any observer 202 that can see the front of the display device 204 is at a position where z>0. Furthermore, if z>0 and x=0 and y=0, then the observer 202 is directly in front of the display device 204 and no correction is needed. In the examples of FIGS. 3 and 4, z>0, x<0 (to the left side of the display device 204) and y<0 (positioned closer to the bottom of the display device 204 than the top of the display device 204).

Accordingly, an example of a method for calculating distortion correction is as follows. There are two primary angles of interest: the first observation angle θ which is the angle of rotation with respect to the (x,y) orientation of the display device 204 and the second observation angle φ which is the obliqueness to the surface of the display device 204. Note that in the example of FIG. 3, θ depends only on the (x,y) coordinates and not on z. The computation of θ can be as follows:

$$\theta = \tan^{-1}(x/y) \text{ for } y < 0$$
$$= \tan^{-1}(x/y) + 180° \text{ for } y > 0$$
$$= 0 \text{ for } y = 0, x = 0$$
$$= 90° \text{ for } y = 0, x < 0$$
$$= -90° \text{ for } y = 0, x > 0.$$

The computation for φ, as depicted in the example of FIG. 4, can be as follows:

$$\phi = \tan^{-1}(\text{sqrt}(x^2+y^2)/z)$$

Once again for z>0, when φ=0, the observer 202 is directly in front of the display device 204; when φ is closer to 90°, the angle is quite oblique.

Given θ and φ, visual content can be distorted to correct for the perspective of the observer 202 so that the display content appears undistorted to the observer 202. Consider that the position of the displayed content is represented in the (x,y) coordinates. For example, the letter "E" may include 4 line segments with the (x,y) coordinates in FIG. 5. To transform the content defined by (x,y) into screen coordinates (p,q), an example transform is as follows:

$$p = \text{sqrt}((x \cos(\phi))^2 + y^2)\cos(\theta + \tan^{-1}(x/(y/\cos(\phi))))$$

$$q = \text{sqrt}((x \cos(\phi))^2 + y^2)\sin(\theta + \tan^{-1}(x/(y/\cos(\phi)))).$$

Figure 5:
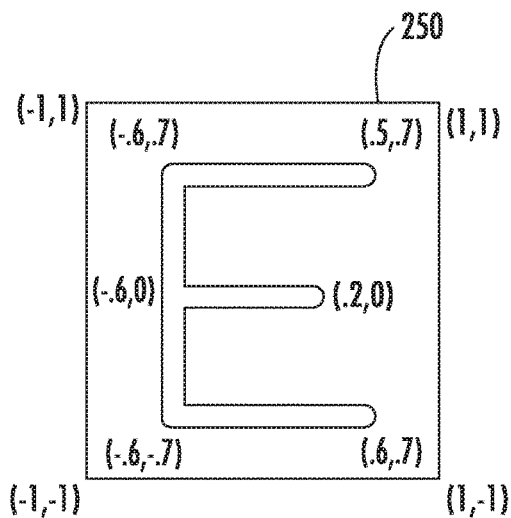
FIG. 5 illustrates an example of display coordinates for display content, in accordance with an embodiment of the disclosure.
Figure 6:
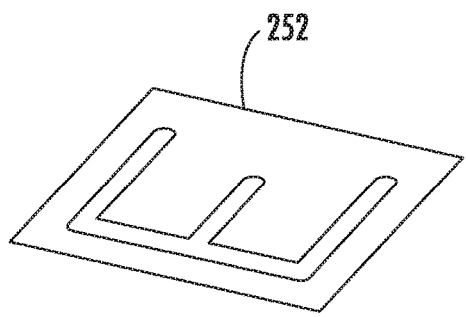
FIG. 6 illustrates an example of an uncorrected view of display content, in accordance with an embodiment of the disclosure.
Figure 7:
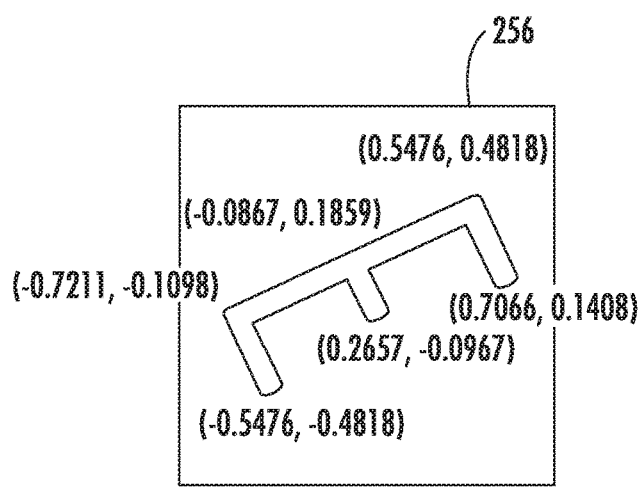
FIG. 7 illustrates an example of display coordinates for a corrected view of display content, in accordance with an embodiment of the disclosure.
Figure 8:
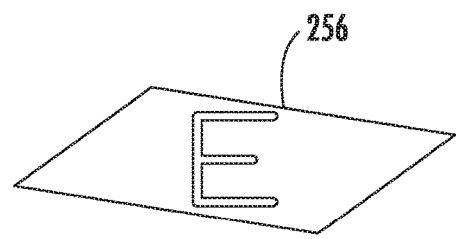
FIG. 8 illustrates an example of a corrected view of display content, in accordance with an embodiment of the disclosure.

FIG. 5 illustrates an example of display coordinates for display content 250 using a coordinate system scaled between coordinates (−1,−1) and (1,1). FIG. 6 illustrates an example of an uncorrected view of display content 252 as the display content 252 may appear to the observer 202 absent correction viewed at angles of θ=−65° and φ=70°. FIG. 7 illustrates an example of display coordinates for a corrected view of display content 254, for instance, using the example transform previously described. FIG. 8 illustrates an example of a corrected view of display content 256 that rotates and rescales the letter "E" to match the perspective of the observer 202 of display device 204.

Figure 9:
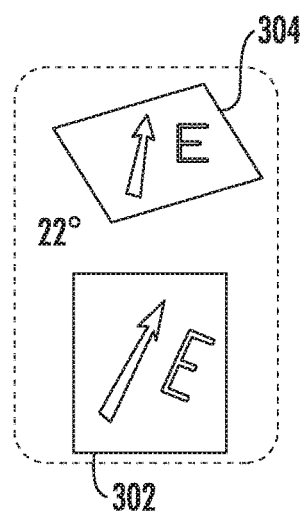
FIG. 9 illustrates an example of differences between actual display content and display content as perceived by an observer in motion, in accordance with an embodiment of the disclosure.
Figure 10:
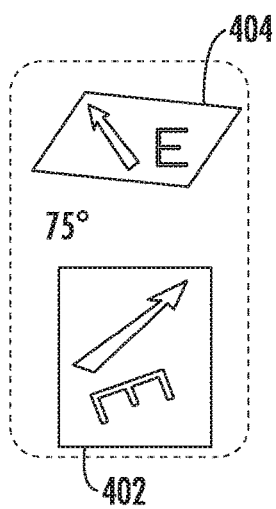
FIG. 10 illustrates an example of differences between actual display content and display content as perceived by an observer in motion, in accordance with an embodiment of the disclosure.
Figure 11:
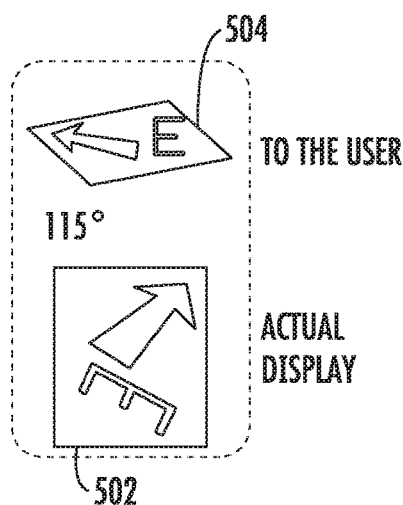
FIG. 11 illustrates an example of differences between actual display content and display content as perceived by an observer in motion, in accordance with an embodiment of the disclosure.

FIGS. 9-11 depict variations of distortion corrections applied by the display adjustment system 114 of FIGS. 1 and 2 based on angular differences. For example, if an angular difference between the observer 102 of FIG. 1 and the display device 104 of FIG. 1 is 22 degrees, a different amount of angular rotation and rescaling is applied as the distortion correction of the display content 302 for a first corrected observation 304 as compared to angular differences of 75 degrees or 115 degrees as depicted in FIGS. 9-11. A distortion correction of the display content 402 for a second corrected observation 404 at 75 degrees can be rotated clockwise and slightly stretched (rescaled) relative to the display content 302 for the first corrected observation 304. The distortion correction of the display content 502 for a third corrected observation 504 at 115 degrees can be further rotated clockwise and stretched relative to the display content 402 for the second corrected observation 404.

Figure 12:
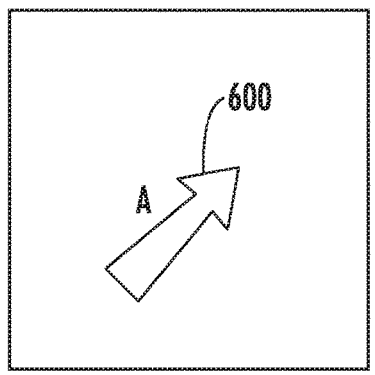
FIG. 12 illustrates a single direction arrow as an example of display content, in accordance with an embodiment of the disclosure.
Figure 13:
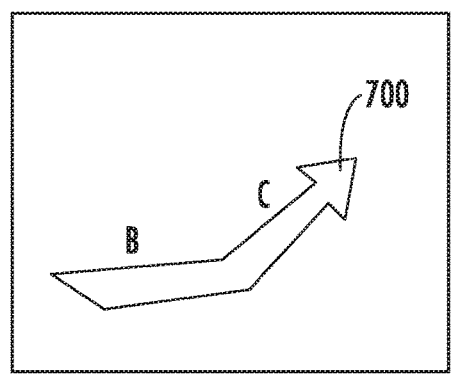
FIG. 13 illustrates a compound direction arrow as an example of display content, in accordance with an embodiment of the disclosure.

FIG. 12 is an example of display content 600 including a graphical depiction of a projection towards a likely future position that can be a change in direction from a current trajectory of an observer, such as observer 102 of FIG. 1. Some embodiments, such as the example of FIG. 13, the display adjustment system 114 of FIGS. 1 and 2 outputs display content 700 including both a graphical depiction of a tracked current direction of the observer 102 and a change in the tracked current direction as a projection towards a likely future position. Thus, both the examples of FIGS. 12 and 13 include arrows indicating a projection towards a likely future position (e.g., when navigating between location 106 and desired end-point location 108 of FIG. 1), the inclusion of the current trajectory of the observer 102 in combination with the projection towards the likely future position, implies a turn and an approximate turn angle needed from the current trajectory to continue moving towards a desired end-point, such as the desired end-point location 108 of FIG. 1. The display content 600, 700 is adjusted by the display adjustment system 114 of FIGS. 1 and 2 to match the position and trajectory of the observer 102 for output on a display device 104, 134 as previously described.

Figure 14:
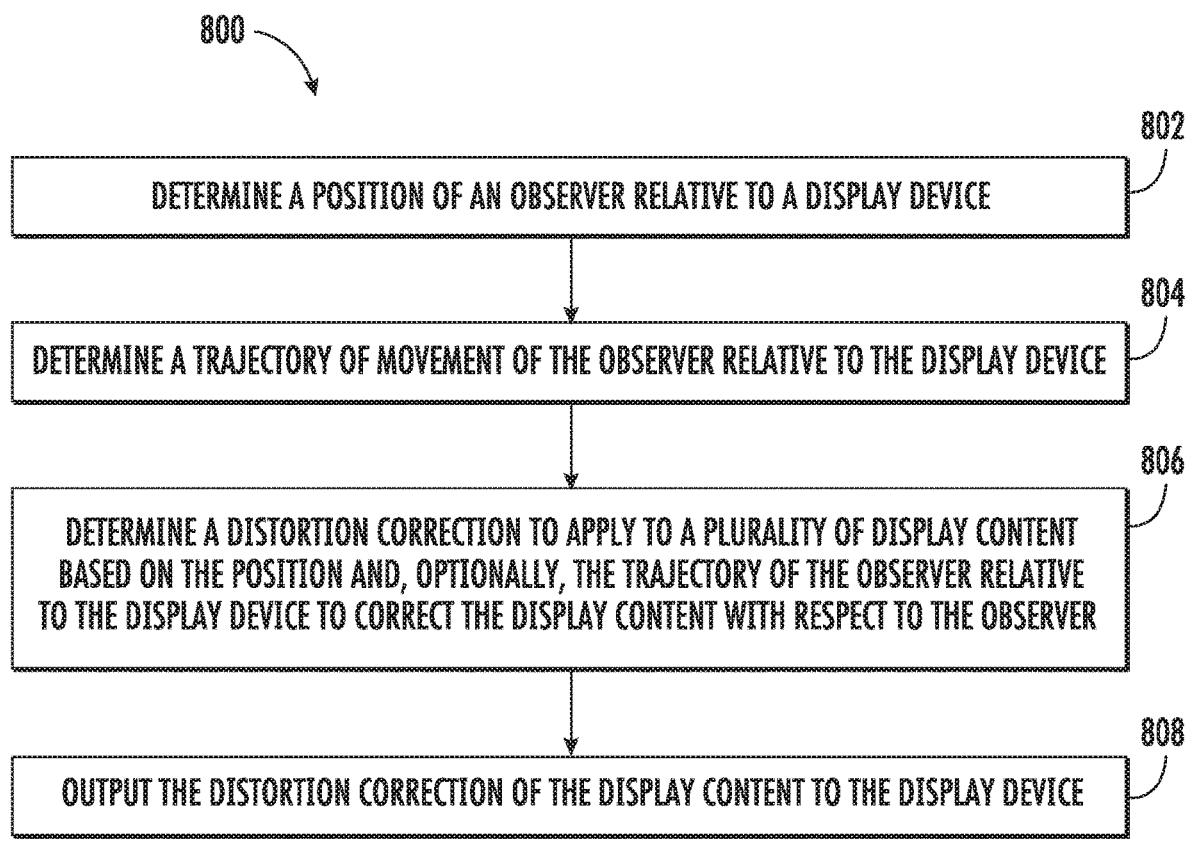
FIG. 14 is a flow diagram illustrating a method, according to an embodiment of the present disclosure.

Referring now to FIG. 14 with continued reference to FIGS. 1-13, FIG. 14 depicts a flow chart of a method 800 of position-based adjustment to display content in accordance with an embodiment of the disclosure. The method 800 can be performed, for example, by the display adjustment system 114 of FIGS. 1 and 2.

At block 802, the display adjustment system 114 can determine a position of an observer 102 relative to a display device 104. Determining the position of the observer 102 relative to the display device 104 can include determining an angular difference between the observer 102 and a display surface of the display device 104.

At block 804, the display adjustment system 114 can determine a trajectory 130 of movement of the observer 102 relative to the display device 104. Determining the trajectory 130 of movement of the observer 102 relative to the display device 104 can include tracking movement of the observer 102 such as through a time series of recent positions of the observer 102 and projecting a likely future position of the observer 102, such as any turns needed to navigate to the desired end-point location 108. The desired end-point location 108 of the observer 102 can be known, for example, based on schedule information, resource availability (e.g., a next elevator car scheduled to reach the elevator lobby 120), a previous request received from the observer 102, an elevator assignment from a destination entry dispatching system, and/or through navigation data exchanged with another application, such as a wayfinding application of a mobile device 203.

At block 806, the display adjustment system 114 can determine a distortion correction to apply to a plurality of display content based on the position and, optionally the trajectory 130, of the observer 102 relative to the display device 104 to correct the display content with respect to the observer 102, for instance, as depicted in the examples of FIGS. 5-11. The likely future position can be determined based on one or more path movement constraints (e.g., objects 128A, 128B) of the observer 102. The display content can include, for example, a graphical depiction of a tracked current direction of the observer 102 and a change in the tracked current direction as a projection towards the likely future position, such as the example of FIG. 13.

At block 808, the display adjustment system 114 can output the distortion correction of the display content to the display device 104. The distortion correction can include at least a rotation and rescaling operation performed on the display content, for instance, as depicted in FIGS. 5-11. The distortion correction can be adjusted as the observer 102 continues to change position relative to the display device 104.

In some embodiments, the display adjustment system 114 can track movement of the observer 102 as the observer 102 transitions from a location 106 proximate to the display device 104 to another location proximate to one or more other display devices 134. A set of content can be displayed to the observer 102 on the one or more other display devices 134 customized for the observer 102, such as a next turn to take in a corridor 220. Movement of the observer 102 can be tracked based on one or more of: at least one feature of the observer 102, and a signal from a mobile device 203 of the observer 102. One or more additional observers 202A, 202B facing the display device 204 may be identified by the display adjustment system 114, for instance, using the sensors 212A, 212B and/or data from one or more mobile device 203. The distortion correction can be adjusted by the display adjustment system 114 to blend the position and the trajectory of an observer 202A and one or more additional observers 202B in correcting the display content on the display device 204.

While the above description has described the flow process of FIG. 14 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of position-based adjustment to display content, the method comprising:
   determining a position of an observer relative to a display device in a fixed position;
   determining a trajectory of movement of the observer relative to the display device by tracking movement of the observer and projecting a likely future position of the observer;
   determining a distortion correction to apply to a plurality of display content based on the position of the observer relative to the display device and the likely future position of the observer to correct the display content with respect to the observer; and
   outputting the distortion correction of the display content to the display device while the display device remains in the fixed position.

2. The method of claim 1, wherein determining the position of the observer relative to the display device comprises determining one or more angular differences between the observer and the display device.

3. The method of claim 1, wherein the display content comprises a graphical depiction of a tracked current direction of the observer and a change in the tracked current direction as a projection towards the likely future position of the observer.

4. The method of claim 1, further comprising:
   adjusting the distortion correction as the observer continues to change position relative to the display device, wherein the distortion correction comprises at least a rotation and rescaling operation performed on the display content.

5. The method of claim 1, further comprising:
   tracking movement of the observer as the observer transitions from a location proximate to the display device to another location proximate to one or more other display devices; and
   displaying a set of content to the observer on the one or more other display devices customized for the observer.

6. The method of claim 5, wherein movement of the observer is tracked based on at least one feature of the observer, a signal from a mobile device of the observer, or the at least one feature of the observer and the signal from the mobile device of the observer.

7. The method of claim 1, further comprising:
identifying one or more additional observers facing the display device; and
adjusting the distortion correction to blend the position of the observer and the one or more additional observers in correcting the display content.

8. The method of claim 7, further comprising:
transitioning the distortion correction from the observer to at least one of the one or more additional observers facing the display device based on detecting a change in a number of observers, detecting a change in observer proximity relative to the display device, or detecting the change in the number of observers and in observer proximity relative to the display device.

9. The method of claim 1, further comprising:
identifying one or more additional observers facing the display device;
partitioning the display device into a plurality of display segments; and
providing separate content with individualized distortion correction to each of the display segments.

10. A system, comprising:
a display device in a fixed position;
one or more sensors operable to detect a position of an observer; and
a display adjustment system operably coupled to the display device and the one or more sensors, the display adjustment system configured to perform a plurality of operations comprising:
determining a position of an observer relative to the display device based on the one or more sensors;
determining a trajectory of movement of the observer relative to the display device by tracking movement of the observer and projecting a likely future position of the observer;
determining a distortion correction to apply to a plurality of display content based on the position of the observer and the likely future position of the observer relative to the display device to correct the display content with respect to the observer; and
outputting the distortion correction of the display content to the display device while the display device remains in the fixed position.

11. The system of claim 10, wherein determining the position of the observer relative to the display device comprises determining one or more angular differences between the observer and the display device.

12. The system of claim 10, wherein the display content comprises a graphical depiction of a tracked current direction of the observer and a change in the tracked current direction as a projection towards the likely future position of the observer.

13. The system of claim 10, wherein the system is further configured to perform the operations comprising:
adjusting the distortion correction as the observer continues to change position relative to the display device, wherein the distortion correction comprises at least a rotation and rescaling operation performed on the display content.

14. The system of claim 10, wherein the system is further configured to perform the operations comprising:
tracking movement of the observer as the observer transitions from a location proximate to the display device to another location proximate to one or more other display devices; and
displaying a set of content to the observer on the one or more other display devices customized for the observer.

15. The system of claim 14, wherein movement of the observer is tracked based on at least one feature of the observer, a signal from a mobile device of the observer, or the at least one feature of the observer and the signal from the mobile device of the observer.

16. The system of claim 10, wherein the system is further configured to perform the operations comprising:
identifying one or more additional observers facing the display device; and
adjusting the distortion correction to blend the position of the observer and the one or more additional observers in correcting the display content.

17. The system of claim 16, wherein the system is further configured to perform the operations comprising:
transitioning the distortion correction from the observer to at least one of the one or more additional observers facing the display device based on detecting a change in a number of observers, detecting a change in observer proximity relative to the display device, or detecting the change in the number of observers and in observer proximity relative to the display device.

18. The system of claim 10, wherein the system is further configured to perform the operations comprising:
identifying one or more additional observers facing the display device;
partitioning the display device into a plurality of display segments; and
providing separate content with individualized distortion correction to each of the display segments.

* * * * *